United States Patent
Thomas (10) Patent No.: US 9,536,073 B2
(45) Date of Patent: Jan. 3, 2017

(54) DEVICE-BASED APPLICATION SECURITY

(71) Applicant: MOTOROLA MOBILITY LLC, Chicago, IL (US)

(72) Inventor: Neil Richard Thomas, Waterloo (CA)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 14/339,580

(22) Filed: Jul. 24, 2014

(65) Prior Publication Data

US 2016/0026786 A1    Jan. 28, 2016

(51) Int. Cl.
*G06F 21/00* (2013.01)
*G06F 21/32* (2013.01)
*G06F 21/31* (2013.01)

(52) U.S. Cl.
CPC ............... *G06F 21/32* (2013.01); *G06F 21/31* (2013.01); *G06F 2221/2113* (2013.01)

(58) Field of Classification Search
CPC .................................. G06F 8/61; G06F 21/44
See application file for complete search history.

(56) References Cited

U.S. PATENT DOCUMENTS

| | | | |
|---|---|---|---|
| 8,677,506 B2* | 3/2014 | Wheeler | 726/27 |
| 2003/0115487 A1* | 6/2003 | Andrews et al. | 713/201 |
| 2003/0196108 A1* | 10/2003 | Kung | 713/200 |
| 2005/0015592 A1* | 1/2005 | Lin | 713/166 |
| 2005/0120242 A1* | 6/2005 | Mayer et al. | 713/201 |
| 2006/0005019 A1* | 1/2006 | Chao | 713/166 |
| 2007/0190977 A1* | 8/2007 | Fok et al. | 455/411 |
| 2009/0099882 A1* | 4/2009 | Karabulut | 705/7 |
| 2009/0254993 A1* | 10/2009 | Leone | 726/25 |
| 2010/0235750 A1* | 9/2010 | Noland | 715/735 |
| 2011/0010761 A1* | 1/2011 | Doyle | 726/5 |
| 2012/0304312 A1* | 11/2012 | Dong | 726/28 |
| 2012/0311671 A1* | 12/2012 | Wood et al. | 726/4 |
| 2013/0318613 A1* | 11/2013 | Archer et al. | 726/25 |
| 2015/0052587 A1* | 2/2015 | O'Neill et al. | 726/4 |

OTHER PUBLICATIONS

Jason Cipriani: "Set a lock code for individual apps on Android", CNET, Tech Culture, Feb. 13, 2012, all pages.

* cited by examiner

*Primary Examiner* — Morshed Mehedi
(74) *Attorney, Agent, or Firm* — Morris & Kamlay LLP (57) ABSTRACT

Disclosed are techniques and apparatuses for implementing device-based application security. These techniques enable a computing device to assign a security level from a hierarchy of security levels to an application. Once the security level is assigned to the application, authentication techniques associated with the security level can be initiated in response to a request to launch the application. When an indication is received that the security level for the application has been satisfied, the application can then be launched, availing a user of the application's full functionality.

17 Claims, 5 Drawing Sheets

DEVICE-BASED APPLICATION SECURITY

TECHNICAL FIELD

The present disclosure is related generally to security techniques and, more particularly, to security techniques for allowing access to applications of a mobile device.

BACKGROUND

Conventional techniques that address application security on mobile devices are often binary—either the mobile device is locked, in which case a user can access a very limited subset of applications, or the mobile device is unlocked, in which case the user has full access to the applications on the mobile device. The subset of applications that are accessible when a mobile device is locked may include just those applications that have been declared to run above the lock screen (e.g., camera, touchless control, lock-screen widgets, and so on). However, mobile-device users may find this approach to be inconvenient in some instances and insufficient in others. Consequently, conventional techniques for application security can be unsatisfactory to mobile-device users.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Conventional techniques for providing application security on mobile devices are often binary. These techniques are considered "binary" insofar as they involve simply locking and unlocking the device, e.g., by entering a 4-digit personal identification number ("PIN"). While the mobile device is locked, a user may be able to access some applications that have been declared to run above the lock screen, such as a camera, touchless control, lock-screen widgets, and so on. Once the device is unlocked, however, the user may have full access to applications on the device. Giving full access to each of the applications with a same authentication technique may be incongruous when security concerns for each application are considered. Entering a 4-digit PIN may seem excessive for launching a game that neither accesses personally identifiable information ("PII") nor delivers such information over a network connection. On the other hand, mere entry of a 4-digit PIN may not be secure enough for launching a banking application that accesses financial information and allows a user to perform financial transactions.

One way in which application developers have chosen to address these issues of application security is to implement authentication techniques on a per-application basis. Developers of banking applications, for example, may program authentication techniques into the banking application that require a user to successfully enter a password before gaining access to banking functionality. Allowing developers to implement security on a per-application basis, however, may result in a host of issues, such as requiring users to remember different passwords for each application, delivering inconsistent user experiences over the variety of applications on a mobile device, applications failing to address security in a way that reflects a security level the device maker (or operating-system provider) would like to be associated with, and so on. Consequently, users can find such approaches for implementing application security on a mobile device to be unsatisfactory.

This disclosure describes techniques and apparatuses that facilitate device-based application security, which enables security to be addressed in a consistent and congruous manner for each of the applications on a mobile device. Device-based application security can be implemented, for example, so that authentication techniques initiated by the device to launch a game are different from those initiated by the device to launch banking applications. Further, by implementing security for the applications at the device level, the device maker (or operating-system provider) can ensure that applications that present similar security concerns are addressed in a consistent manner.

The device-based application-security techniques described herein can assign a security level from a hierarchy of security levels to an application on a mobile device. The hierarchy of security levels represents levels of authentication techniques that are required to launch applications.

By way of example, the hierarchy may include three security levels, where higher security levels are associated with increasingly stronger authentication techniques. In this example, a lowest security level may not require a user to provide any input to launch an application assigned to this level, such as no additional input after a device is unlocked and applications are accessible. To launch an application assigned to the next security level (e.g., a medium security level), a user may be required to enter a 4-digit PIN. To launch an application assigned to the highest security level, however, a user may be required to satisfy the conditions of an even stronger authentication technique, such as entering a password of at least ten characters that include at least one number and at least one capital letter, providing biometric information (e.g., a thumb print, a picture of the user's face, and so on), and so forth.

When a request to launch an application is received (e.g., a user taps an icon representative of an application on a home screen of a device), the authentication technique of the security level assigned to the application can be initiated. Continuing with the example above, if the request is received for an application assigned to the medium security level, a process to display an interface for entering a 4-digit PIN can be initiated. After the assigned security level for the application has been satisfied by the authentication technique, the application is then launched for user access.

Figure 1:
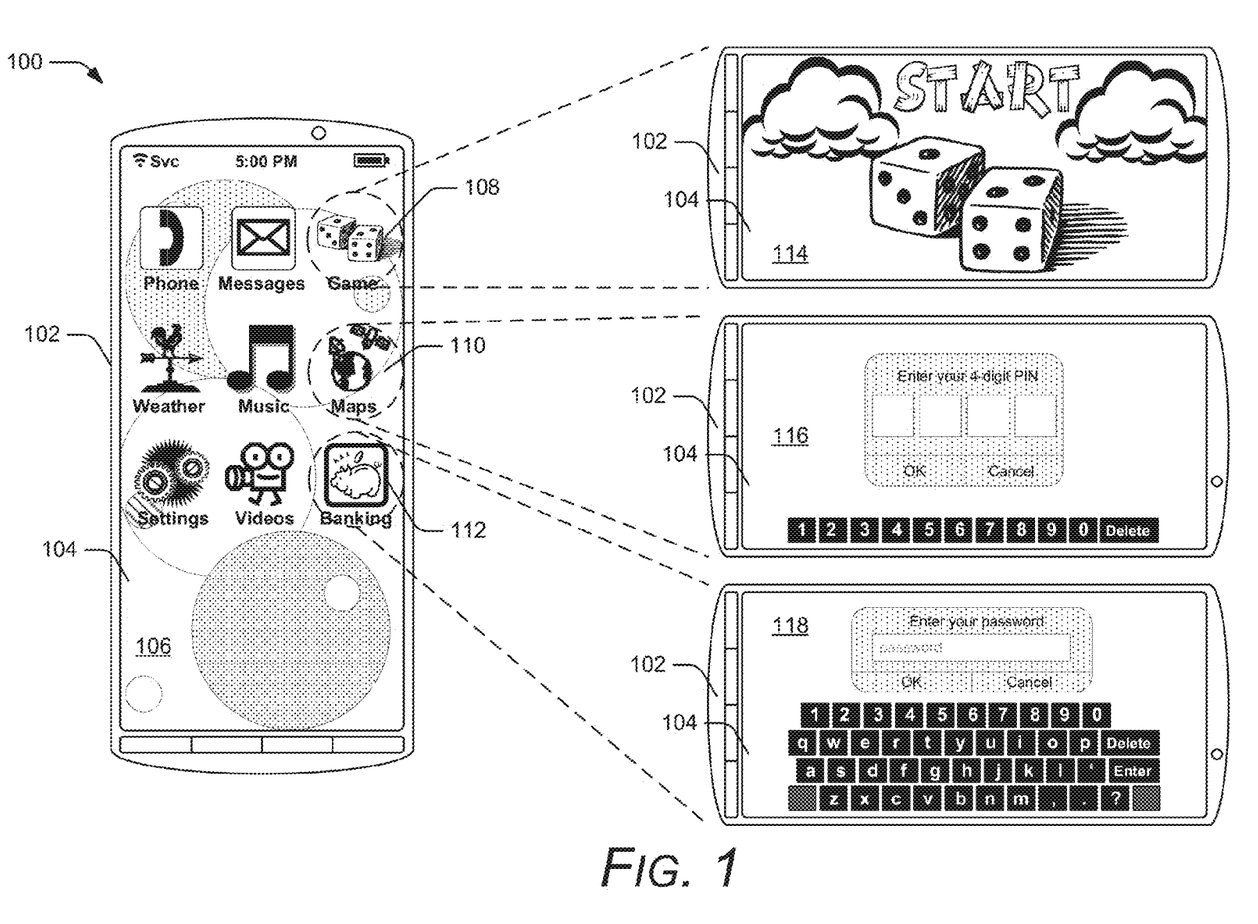
FIG. 1 is an overview of a representative environment in which the present techniques may be practiced.

FIG. 1 illustrates an example environment 100 in which techniques described herein can be implemented. Environment 100 includes a computing device 102 having a display 104 capable of displaying various user interfaces to interact with applications on the computing device 102. Display 104 can display a home screen 106 from which a user of the computing device 102 can request to launch applications. Display 104 can be configured as a touchscreen that allows a user to request that an application be launched by performing a gesture (e.g., tapping) relative to an icon representative of the application.

Home screen 106 can include several icons that are selectable to launch applications represented by those icons. By way of example, consider icons 108, 110, 112 which represent a game application, a maps application, and a banking application, respectively. By performing a gesture relative to icon 108, a user can request to launch the game application. In a similar manner, gestures performed relative to icons 110, 112 can be recognized as requests to launch the maps application and the banking application.

Prior to launching an application, a security level from a hierarchy of security levels is assigned to the application. The hierarchy of security levels represents levels of authentication techniques required to launch applications when initiated by a user of the device. A particular security level of the hierarchy can be assigned to an application based on a variety of factors, such as an indication of the security level coded into the application by its developer, user input that indicates which security level to assign to the application, PII exposed by the application, or permissions the application requests from the computing device 102. The techniques described herein enable different security levels of the hierarchy to be assigned to different applications.

Using the environment 100 of FIG. 1 as an example, the security level assigned to the banking application can be different from the security level assigned to the maps application, both of which can be different from the security level assigned to the game application. The security level assigned to the banking application can be different from that assigned to the maps application insofar as it corresponds to stronger authentication techniques, e.g., entry of a password compared to simply entry of a 4-digit PIN. In a similar manner (based on differences in authentication-technique strength), the security level assigned to the maps application can be different (e.g., stronger) than that assigned to the game application. It is also to be appreciated that a same security level can be assigned to similar applications. A banking application and an online payment application may be assigned to the same security level, for example.

Regardless of the security level assigned to an application, the authentication techniques of the assigned security level can be initiated when a request to launch the application is received. In the context of FIG. 1, a user may select icon 108 and thereby request to launch the game application. As discussed just above, the security level assigned to the game application can be different from that assigned to the maps or banking application. In particular, the security level assigned to the game application can correspond to less stringent authentication techniques than the security levels of the maps and banking applications.

In FIG. 1, the authentication techniques required to launch the game application are represented by start screen 114. After icon 108 is selected by a user to request launch of the game application, start screen 114 can be displayed without requiring any additional user input, such as entry of a 4-digit PIN or password. This can be the case if the security level assigned to the game application corresponds to an authentication technique that does not require any input from a user to launch an application. The lowest or lower security levels of a security-level hierarchy can represent such authentication techniques, e.g., those that require little or no user input to launch applications.

In contrast, consider PIN screen 116 and password screen 118. PIN screen 116 can be displayed responsive to selection of icon 110 to launch the maps application, and password screen 118 can be displayed responsive to selection of icon 112 to launch the banking application. PIN screen 116 represents the authentication techniques required to launch the maps application, and password screen 118 represents the authentication techniques required to launch the banking application. Once a 4-digit PIN is successfully entered via the PIN screen 116, the maps application can be launched, giving the user full access to its features. Likewise, after a password is successfully entered via the password screen 118, the banking application can be launched, giving the user full access to its features. In this example, entering a password is considered a stronger authentication technique, and therefore associated with a higher security level in the hierarchy, than entering a 4-digit PIN. It is to be appreciated, however, that in some implementations of device-based application security, entry of a 4-digit PIN can be considered a stronger authentication technique and thus associated with a higher security level than entering a password. In any case, start screen 114, PIN screen 116, and password screen 118 represent different authentication techniques that can be initiated in response to requests to launch applications.

Figure 2:
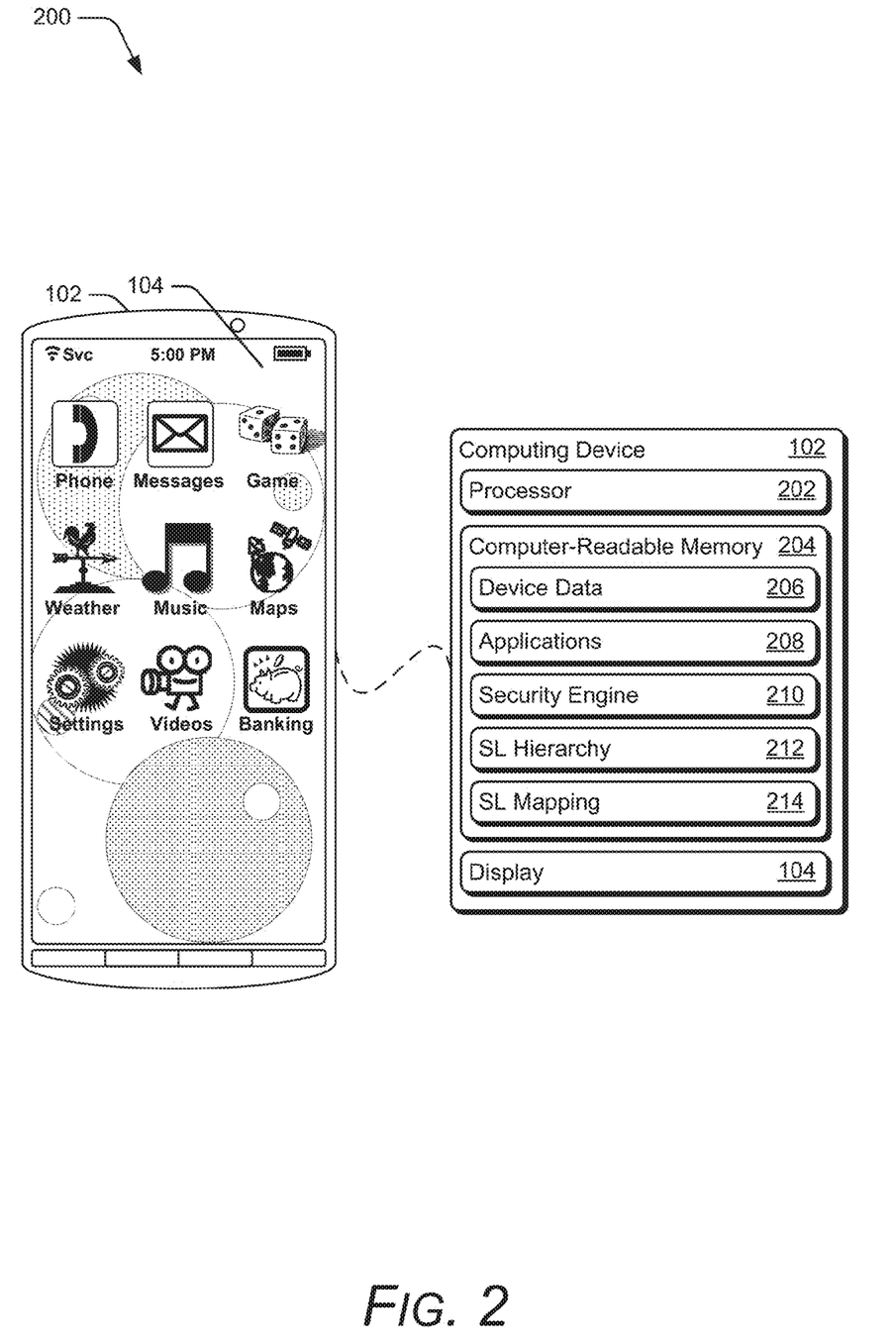
FIG. 2 is a generalized schematic of a computing device capable of implementing device-based application security.

More specifically, consider FIG. 2, which illustrates at 200 an example embodiment of computing device 102 of FIG. 1. Computing device 102 can be, or can include, many different types of computing or electronic devices capable of implementing device-based application security. In this example, computing device 102 is shown as a smart phone, though other devices are contemplated. Other computing devices 102 may include, by way of example, a cellular phone, notebook computer (e.g., netbook or ultrabook), camera (compact or single-lens reflex) smart-watch, smart-glasses, tablet computer, personal media player, personal navigating device (e.g., global positioning system ("GPS")), gaming console, desktop computer, video camera, or portable gaming device.

Computing device 102 includes processor 202, which may be configured as a single or multi-core processor capable of enabling various functionalities of computing device 102. In some cases, processor 202 includes a digital-signal-processing subsystem for processing various signals or data of computing device 102. Processor 202 may be coupled with, and may implement functionalities of, any other components or modules of computing device 102 that are described herein.

Computing device 102 includes computer readable-memory ("CRM") 204. CRM 204 includes device data 206, such as an operating system or firmware of computing device 102 that are executable by processor 202. Device data 206 may also include various user data, such as images, music, documents, emails, contacts, and the like. CRM 204 also includes applications 208 that are executable by the processor 202 and application-security engine 210, which in this example is embodied as computer-executable code stored on CRM 204. In this example, CRM 204 is illustrated as including security-level ("SL") hierarchy 212 and a mapping of applications to security levels 214.

Security engine 210 can assign a security level of SL hierarchy 212 to an application. To do so, security engine 210 can assess a variety of factors, such as whether an indication of a security level is coded into the application by its developer, whether user input is received that indicates the security level to assign to the application, PII the application is configured to expose, and permissions requested by the application. Once a determination is made regarding which security level of SL hierarchy 212 to assign to an application, security engine 210 can create an entry in the SL mapping 214 that maps the application to the assigned security level in the hierarchy.

Figure 3:
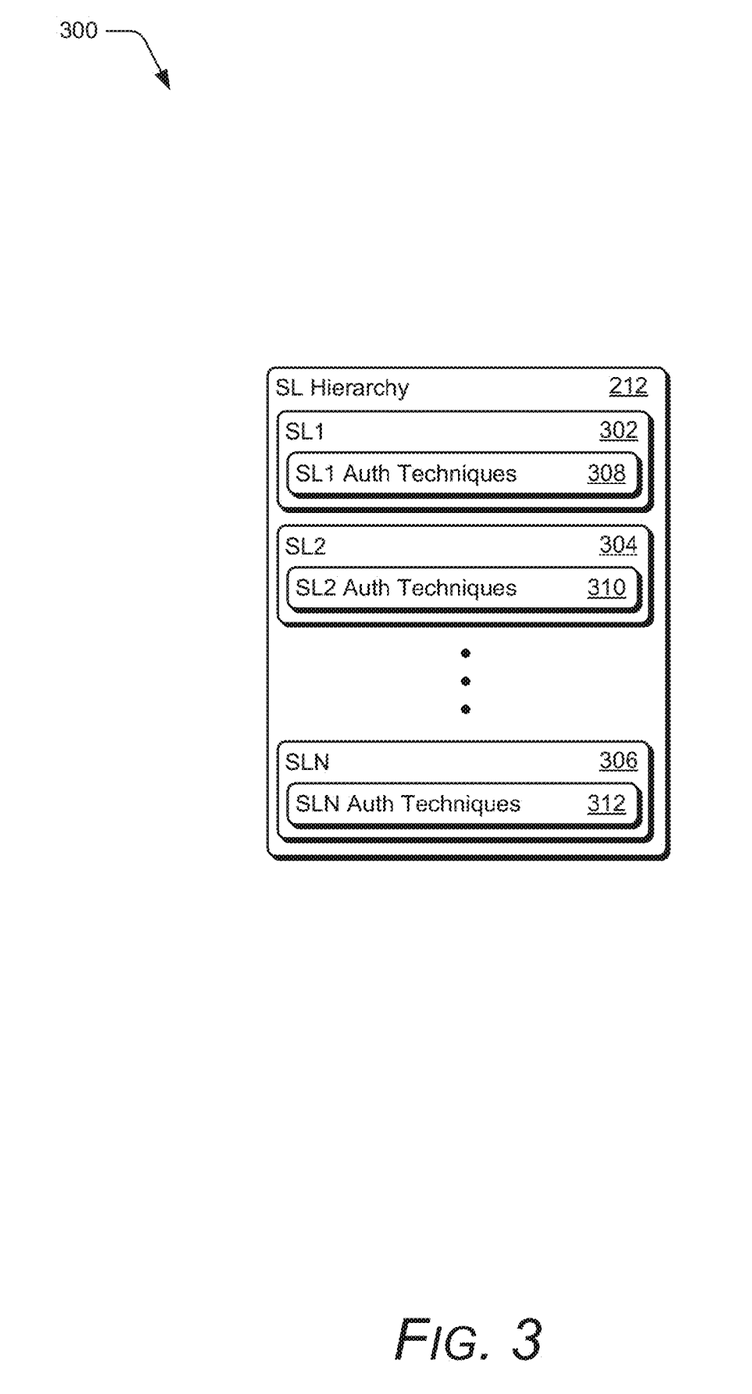
FIG. 3 is a generalized schematic of portions of the computing device depicted in FIG. 2 in greater detail.

Refer now to FIG. 3 which illustrates at 300 an example embodiment of SL hierarchy 212 depicted in FIG. 2. SL hierarchy 212 includes security level 1 ("SL1") 302, SL2 304, and SLN 306. Thus, in the example at 300, SL hierarchy 212 has at least three different security levels but may have more, e.g., up to N different security levels. Although SL hierarchy 212 is depicted with at least three different security levels, SL hierarchy 212 may have more or fewer levels without departing from the spirit of the techniques described herein.

Further, the security levels, SL1 302, SL2 304, and SLN 306 can each be associated with respective authentication techniques, as illustrated. SL1 302 includes SL1 authentication techniques 308, SL2 304 includes SL2 authentication techniques 310, and SLN 306 includes SLN authentication techniques 312. In this example, SL1 authentication techniques 308, SL2 authentication techniques 310, and SLN authentication techniques 312 can represent increasingly stronger authentication techniques. It follows then that SL1 302, SL2 304, and SLN 306 represent increasing levels of security in SL hierarchy 212.

Given such a configuration of SL hierarchy 212, SL1 authentication techniques 308 can represent authentication techniques that do not require user input to launch an application, such as those discussed with reference to start screen 114. SL2 authentication techniques 310, however, represent stronger authentication techniques than those represented by SL1 authentication techniques 308. SL2 authentication techniques 310 can represent an authentication technique that requires a user to successfully enter a 4-digit PIN before an application is launched, for example. Still further, SLN authentication techniques 312 represent stronger authentication techniques than those represented by SL2 authentication techniques 310. For example, SLN authentication techniques 312 can represent an authentication technique that requires a user to successfully enter a password having at least one lowercase letter, one capital letter, one number, and one symbol. It is to be appreciated that SL1 authentication techniques 308, SL2 authentication techniques 310, and SLN authentication techniques 312 can represent different authentication techniques than those described above without departing from the spirit and scope of the techniques described herein. By way of example and not limitation, other authentication techniques can include biometric authentication techniques (e.g., finger-print identification), capturing a photograph of the user and performing facial recognition, entry of a custom gesture using touch input, capturing speech from a user and performing audio recognition, and so on.

Security engine 210 can consider whether a security level has been coded into an application when assigning a security level to the application. In some implementations, the device-based application-security techniques described herein allow developers to include code in an application that indicates which security level to assign to the application. With reference to FIG. 3, for example, a developer of an application can indicate in his code to set the security level of the application to SL1 302. Security engine 210 can then ascertain the indicated security level in conjunction with assigning a security level to the application. Once ascertained, security engine 210 can use the indicated security level as a basis for assigning the security level to the application.

Security engine 210 can also consider whether user input has been received that indicates a security level to assign to an application. With reference again to FIG. 3, a user of computing device 102 can be presented with an interface on display 104 that allows the user to select which of SL1 302, SL2 304, or SLN 306 to assign to an application. Security engine 210 can initiate such an interface to be presented to a user when first assigning a security level to the application. An interface to select or change security levels for applications 208 can also be displayed at any time, e.g., when a user selects to change settings of computing device 102. After a user selects a security level for an application, security engine 210 can use the selected security level as a basis for assigning the security level to the application.

An interface that allows a user to select security levels for an application may limit which of the security levels the user can select, however. Security engine 210 may determine a minimum security level for a particular application, and the user interface simply may not allow the user to change the security level below the determined minimum level. Using the banking application as an example, security engine 210 may assign the banking application to SLN 306, but determine that SL2 304 is a minimum security level for the banking application. As such, when a user interface is presented for changing the security level of the banking application, the user interface may indicate that the current security level of the banking application is SLN 306. The user interface may also provide an option that allows the user to change the security level of the banking application from SLN 306 to SL2 304. An option to change the security level to SL1 302 may be grayed out, frozen, or not appear at all, however, indicating that the security level of the banking application cannot be changed so SL1 302. Alternately, the user interface may not limit which security levels of SL hierarchy 212 a user can select to assign to an application.

Additionally, security engine 210 can perform an assessment of an application, in which a variety of factors are considered, to automatically assign a security level to the application. In doing so, security engine 210 can consider a developer-provided indication or user input indicating a security level as factors in determining which security level to assign to the application. However, security engine 210 can also determine which security level to assign an application without considering these factors. Regardless of whether security engine 210 considers a developer-provided indication or user input indicating a security level, the security engine 210 can consider other factors to determine which security level to assign to an application.

Security engine 210 can consider PII exposed by an application, for example. Some types of PII may be more sensitive or cause greater harm if compromised than other types of PII. Consequently, security engine 210 can assign higher security levels (e.g., those having stronger authentication techniques) to applications that access more sensitive types of PII than to applications that access less sensitive types of PII. In the context of FIG. 3, an application that exposes financial-account information (e.g., a banking application) can be assigned to SLN 306 whereas an application that merely exposes location information (e.g., a maps application) can be assigned to SL2 304.

To determine the types of PII that an application puts at risk, the security engine 210 can check for a declaration in the code that specifies the types of PII used by the application. Device-based application-security techniques may be implemented so that defined types of PII an application can put at risk are recognized, such as contact information, financial accounts, messages from other users, location information, identity information (e.g., social security number, passport number, driver's license number, etc.), and so forth. Given the PII-type definitions, developers can declare in an application's code which of the PII types the application exposes. Further, a user may be able to specify which PII types he is comfortable having exposed by an application, e.g., via a settings interface. A user may also be able to specify which security levels to assign to applications that expose certain PII types via the settings interface. Security engine 210 can then assign a security level to an application according to the PII-type declaration in the application and user specification regarding PII types. Applications that do not expose PII types the user is unwilling to expose can be assigned to a lower security level, e.g., SL1 302 in the context of FIG. 3.

Security engine 210 can also be configured to detect PII types that are exposed by an application in other ways. Security engine 210 can monitor packets that an application intends to send over a network for PII types, for example. Based on information included in the packets, security engine 210 can then assign a security level to the application. If the application attempts to send different PII types than those declared in the application, then the security engine 210 can cause a user to be notified of the discrepancy and to be prompted to change the security level assigned to the application.

Security engine 210 can also consider permissions requested by an application when determining which security level to assign to the application. Some permissions, if granted, may enable an application to cause more harm than other permissions. Consequently, security engine 210 can assign higher security levels (e.g., those having stronger authentication techniques) to applications that request potentially harmful permissions than applications that request permissions with less potential for harm. Device-based application-security techniques may be implemented so that if an application requests a permission on a list of permissions, security engine 210 can force the application into a higher security level. By way of example and not limitation, the list of permissions can include direct access to dial phone numbers, access to send electronic messages, access to GPS location, and so on.

Security engine 210 can also assign a security level to an application based on the permissions requested by the application and on user input regarding the requested permissions. For example, a user may be able to specify which permissions he is comfortable granting to an application via the settings interface. The user may also be able to specify which security levels to assign to applications that request certain permissions via the settings interface. Given these user preferences and permissions that are requested, the security engine 210 can assign a security level to a permission-requesting application.

In addition to assigning a security level to an application based on input received from a user of the computing device 102, security engine 210 can assign a security level to an application based on a security level that users of other devices assign to the application. Security engine 210 of computing device 102 may assign SL2 304 to the maps application, for example. Security engines of other computing devices may also assign SL2 304 to instances of the maps application at those other devices. After using the maps application, however, users of such other devices may decide that the security level assigned to their instances of the maps application (SL2 304) should be changed. A user may determine, for example, that based on the PII accessed by the maps application, its security level is to be changed to a higher security level, such as SLN 306. Consequently, the user may manually change the security level assigned to his instance of the maps application to SLN 306.

Once a threshold number of other device users have manually changed the security level of the maps application, an indication of these changes may be communicated to computing device 102. Responsive to receiving this indication, security engine 210 can automatically change the security level assigned to the maps application on computing device 102. In this particular example, the security engine 210 can change the security level so that SLN 306 is assigned to the maps application at computing device 102 rather SL2 304. Alternately, security engine 210 can cause a notification to be displayed to the user that indicates the change made at the other devices. The notification can prompt the user of computing device 102 to change the security level assigned to the maps application. The notification can also include an option therein that allows the user to change the security level assigned to the maps application. In any case, security engine 210 can consider manual security-level selections (or changes) made by users of other devices when determining which security level to assign to an application.

Once the security engine 210 assigns a security level to an application, security engine 210 can cause the authentication techniques of the assigned security level to be administered when a request to launch the application is received. It should be noted that security engine 210 represents functionality of computing device 102 to administer the authentication techniques in lieu of applications 208. The device-based application security described herein can be performed at an operating-system level or firmware level of computing device 102 rather than by applications 208. Accordingly, security engine 210 initiates the corresponding authentication technique when a request is received to launch an application. The security engine 210 can check the SL mapping 214 to ascertain which security level is assigned to the application and then administer the authentication technique represented by that level. After an indication that the authentication technique for the assigned security level has been satisfied, security engine 210 can enable launch of the application.

The following discussion describes techniques enabling device-based application security. These techniques enable a computing device to assign a security level of a hierarchy of security levels to an application. Once the security level is assigned to the application, authentication techniques represented by the security level can be initiated in response to a request to launch the application. When an indication is received that authentication techniques of the security level for the application have been satisfied, the application can then be launched, availing a user of the application's full functionality. These techniques can be implemented utilizing the previously described environment, such as security engine 210, SL hierarchy 212, and SL mapping 214 of FIG. 2. These techniques include the example method illustrated in FIG. 4, which is shown as operations performed by one or more entities.

Figure 4:
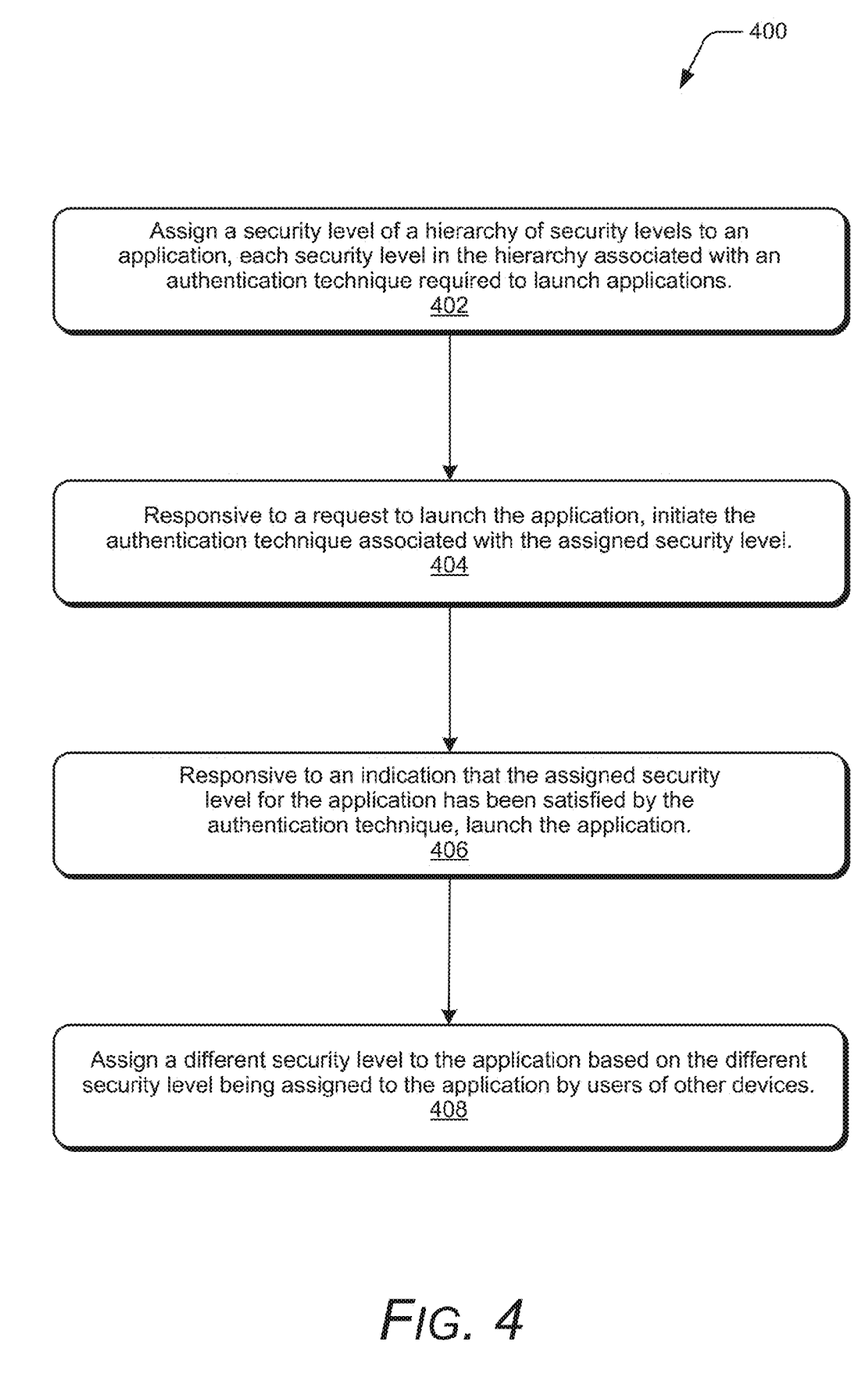
FIG. 4 is a flowchart of a representative method for assigning a security level from a hierarchy of security levels to an application and launching the application in accordance with the assigned security level.

FIG. 4 is a flowchart 400 of a representative method for assigning a security level from a hierarchy of security levels to an application and launching the application in accordance with the assigned security level.

At 402, a security level from a hierarchy of security levels is assigned to an application. Each of the security levels in the hierarchy is associated with an authentication technique required to launch applications. By way of example, security engine 210 assigns SL2 304 to the maps application on computing device 102. SL2 304 corresponds to SL2 authentication techniques 310, which can involve entry of a 4-digit PIN. Security engine 210 can assign SL2 304 to the maps application based on any of a variety of factors, such as the maps application including a declaration in its code indicating that SL2 304 be assigned, receiving user input specifying that SL2 304 be assigned to the maps application, a determination that the maps application exposes PII that corresponds to SL2 304, a determination that the maps application requests permissions that correspond to SL2 304, and so on.

At 404, the authentication technique associated with the assigned security level is initiated responsive to a request to launch the application. By way of example, a user requests to launch the maps application, e.g., by performing a gesture relative to icon 110 of FIG. 1. Responsive to this request, security engine 210 initiates SL2 authentication technique 310 because it is the authentication technique of the security level assigned to the maps application (SL2 304). As noted above, SL2 authentication technique 310 can involve entry of a 4-digit PIN. In this example, security engine 210 can cause an interface to be displayed via display 104 that allows a user of computing device 102 to enter his 4-digit PIN.

At 406, the application is launched responsive to an indication that the assigned security level for the application has been satisfied by the authentication technique. By way of example, a user of computing device 102 successfully enters his 4-digit PIN via PIN screen 116. Security engine 210 determines that the 4-digit PIN was successfully entered and generates an indication indicating that SL2 304 has been satisfied by SL2 authentication techniques 310 (entry of the 4-digit PIN). Alternately, the security engine 210 receives the indication indicating that SL2 304 has been satisfied by SL2 authentication technique 310. Regardless of whether security engine 210 makes the determination itself or receives the indication that SL2 304 is satisfied, the maps application can be launched as a result of SL2 304 being satisfied by SL2 authentication technique 310.

At (optional) 408, a different security level is assigned to the application based on the different security level being assigned to the application by users of other devices. By way of example, devices other than computing device 102 include the maps application. Like security engine 210, the security engines of the other devices initially assign SL2 304 to the maps application on those devices. In this example, the users of those other devices manually change the security level assigned to the maps application on their devices. When at least a threshold number of other users have changed the security level initially assigned to the maps application on their devices, security engine 210 may be notified of the changes. Responsive to receiving such a notification, security engine 210 may change the security level assigned to the maps application on computing device 102 so that SLN 306 is assigned instead. In this way, the security engine 210 can ensure that the level of security applied to an application on computing device 102 is commensurate with that established by the mobile-device-using community.

Figure 5:
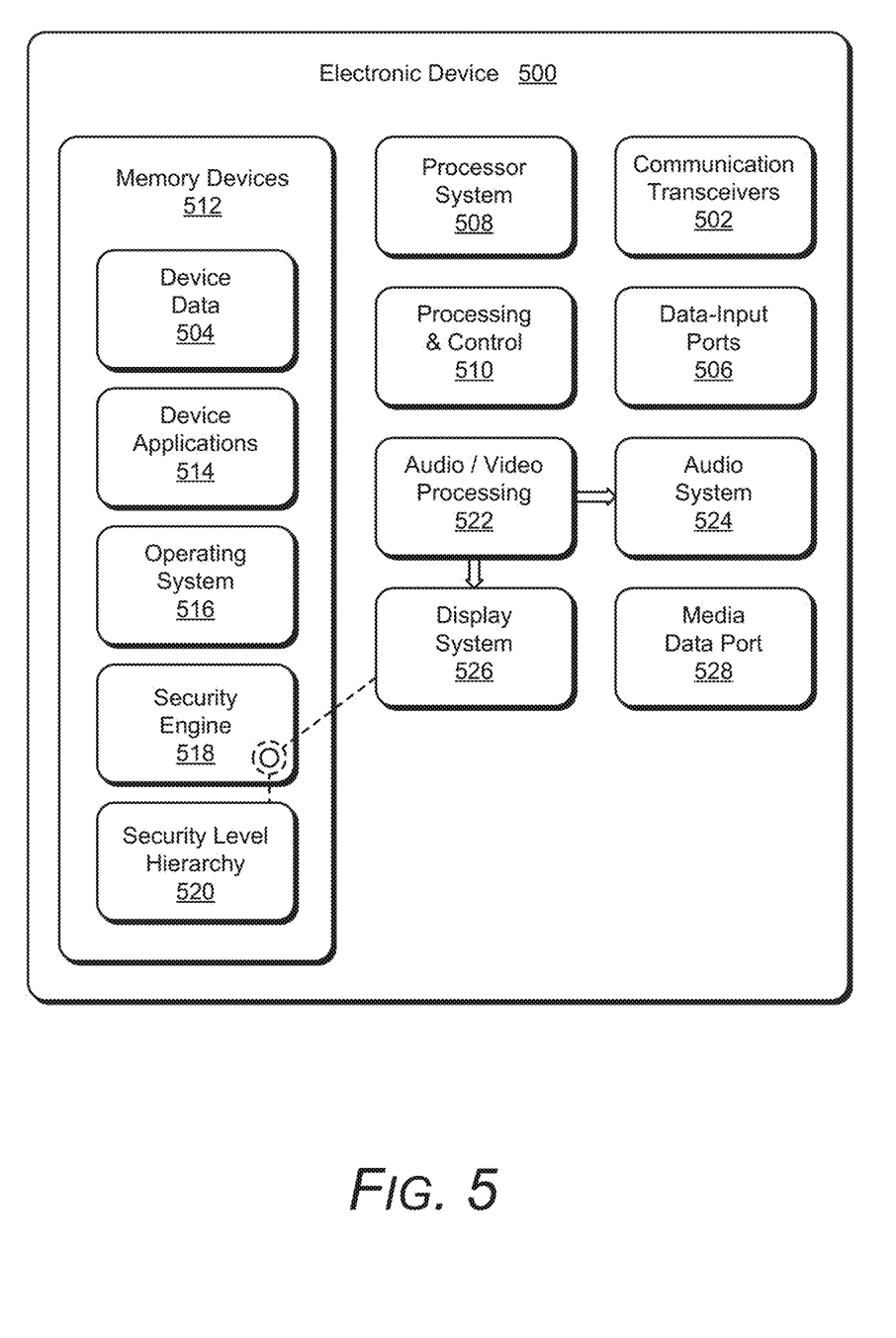
FIG. 5 is a generalized schematic of various components of an electronic device that can implement device-based application-security techniques.

FIG. 5 illustrates various components of an example electronic device 500 that can be implemented as a computing device as described with reference to any of the previous FIGS. 1 through 4. Electronic device 500 can be any of many different types of devices that include many different applications for which device-based application security can be implemented, such as the computing device 102 described with reference to FIG. 1.

Electronic device 500 includes communication transceivers 502 that enable wired or wireless communication of device data 504, such as received data and transmitted data, via a network or other connection. In some cases, these transceivers are for communicating via a wireless network or directly with other devices such as by near-field communication. Example wireless communication transceivers include wireless personal-area network radios compliant with various Institute of Electrical and Electronics Engineers ("IEEE") 802.15 standards, wireless local-area network radios compliant with any of the various IEEE 802.11 standards, wireless wide-area networks radios for cellular telephony, and wireless metropolitan area network radios compliant with various IEEE 802.16 standards.

Example wired communication transceivers include wired local area network Ethernet transceivers, serial data interfaces, audio/video ports (e.g., high-definition multimedia interface ("HDMI") ports), and Universal Serial Bus ("USB") ports. These may be implemented using standard connectors or through the use of proprietary connectors and associated cables providing enhanced security or interconnect density.

Electronic device 500 may also include one or more data-input ports 506 via which any type of data, media content, and inputs can be received, such as user-selectable inputs, messages, music, television content, recorded video content, and any other type of audio, video, or image data received from any content or data source. Data-input ports 506 may include USB ports, coaxial-cable ports, and other serial or parallel connectors (including internal connectors) for flash memory, digital versatile discs, compact discs, and the like. These data-input ports may be used to couple the electronic device 500 to components, peripherals, or accessories such as keyboards, microphones, or cameras.

Electronic device 500 of this example includes processor system 508 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or in addition, the electronic device can be implemented with any one or combination of software, hardware, firmware, or fixed-logic circuitry that is implemented in connection with processing and control circuits, which are generally identified at 510. Although not shown, electronic device 500 can include a system bus, crossbar, interlink, or data-transfer system that couples the various components within the device 500. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 500 also includes one or more memory devices 512 that enable data storage, examples of which include random-access memory, non-volatile memory, and a disk storage device. Memory devices 512 are implemented at least in part as physical devices that store information (e.g., digital or analog values) in storage media, which do not include propagating signals or waveforms. The storage media may be implemented as any suitable types of media such as electronic, magnetic, optic, mechanical, quantum, atomic, and so on. Memory devices 512 provide data-storage mechanisms to store the device data 504, other types of information or data, and various device applications 514 (e.g., software applications). An operating system 516 can be maintained as software instructions within memory devices 512 and executed by processor system 508. In some aspects, security engine 518 and security-level hierarchy 520 are embodied in memory devices 512 of electronic device 500 as executable instructions or code. Although represented as a software implementation, security engine 518 may be implemented as any form of a control application, software application, signal-processing and control module, firmware that is installed on the device, a hardware implementation, and so on.

Electronic device 500 also includes audio and video processing system 522 that processes audio data and passes through the audio and video data to audio system 524 and to display system 526. Audio system 524 and display system 526 may include any modules that process, display, or otherwise render audio, video, display, or image data, such as from security engine 518. Display data and audio signals can be communicated to an audio component and to a display component via a radio-frequency link, S-video link, HDMI, composite-video link, component-video link, digital video interface, analog-audio connection, or other similar communication link, such as media-data port 528. In some implementations, audio system 524 and display system 526 are external components to electronic device 500. Display system 526 can also be an integrated component of the example electronic device 500, such as part of an integrated display and touch interface.

Electronic device 500 may also include sensors (not shown), which enable electronic device 500 to sense various properties, variances, or characteristics of an environment in which electronic device 500 operates. Sensors may include any suitable type of sensor, such as an infrared sensor, proximity sensor, light sensor, acoustic sensor, magnetic sensor, temperature/thermal sensor, micro-electromechanical systems, camera sensor (e.g., a charge-coupled device or complementary-metal-oxide semiconductor sensor), capacitive sensor, and so on. In some cases, sensors enable interaction with, or receive input from, a user of electronic device 500. In such a case, sensors may include piezoelectric sensors, capacitive-touch sensors, input sensing-logic associated with hardware switches (e.g., keyboards, snap-domes, or dial-pads), and so on.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A computer-implemented method comprising:
   receiving, by a particular computing device, an indication of a particular security level that has been assigned to an application by at least a threshold number of other computing devices;
   assigning, by the particular computing device, the particular security level to the application based on the received indication, the assigned security level selected from a hierarchy of security levels, each security level in the hierarchy associated with an authentication technique;
   responsive to a request to launch the application, initiating, by the particular computing device, an authentication technique associated with the assigned security level; and
   responsive to an indication that the assigned security level has been satisfied by the authentication technique, launching, by the particular computing device, the application.

2. The computer-implemented method of claim 1 wherein the assigned security level is assigned to the application based on an indication of a security level coded in the application.

3. The computer-implemented method of claim 1 wherein the assigned security level is assigned to the application based on user input that indicates a security level to assign.

4. The computer-implemented method of claim 1 wherein the assigned security level is assigned to the application automatically without consideration for a security level coded in the application or user input that indicates a security level to assign.

5. The computer-implemented method of claim 1 wherein the assigned security level is assigned based on personally identifiable information the application is configured to expose.

6. The computer-implemented method of claim 1 wherein the assigned security level is assigned based on permissions the application requests from the particular computing device.

7. The computer-implemented method of claim 1 wherein the assigning, initiating, and launching are performed at an operating-system level of the particular computing device.

8. The computer-implemented method of claim 1 further comprising notifying a user of the particular computing device that the particular security level has been assigned to the application by other computing devices.

9. The computer-implemented method of claim 8 further comprising presenting the user with an option to assign the particular security level to the application in conjunction with notifying the user that that the particular security level has been assigned to the application by other computing devices.

10. A computing device comprising:
    a security engine embodied at least partially in hardware of the computing device and configured to assign a security level from a hierarchy of security levels to applications of the computing device, each of the security levels in the hierarchy associated with an authentication technique, and a security level of the hierarchy assigned to a given application based on a received indication of a particular security level that has been assigned to the given application by at least a threshold number of other computing devices.

11. The computing device of claim 10 wherein the security engine is further configured to automatically assign the particular security level to the given application based on:

permissions that the given application requests or an assessment of personally identifiable information exposed, and without consideration as to whether a security level is coded into the given application or user input received that indicates a security level to assign.

12. The computing device of claim 10 wherein the security engine is further configured to initiate an authentication technique associated with the assigned security level responsive to receiving a request to launch the given application.

13. The computing device of claim 10 wherein the security engine is further configured to generate an indication that the assigned security level for the given application has been satisfied.

14. The computing device of claim 13 wherein the indication that the assigned security level has been satisfied enables the given application to be launched.

15. The computing device of claim 10 wherein the security engine is further configured to maintain a mapping that maps the applications of the computing device to assigned security levels.

16. A computer-implemented method comprising:
  assigning, by a particular computing device, a first security level from a hierarchy of security levels to a first application, each security level in the hierarchy associated with an authentication technique required to launch applications on the particular computing device;
  receiving, by the particular computing device, an indication of a second security level that has been assigned to a second application by at least a threshold number of other computing devices; and
  assigning, by the particular computing device, the second security level to the second application based on the received indication of the second security level, the second security level selected from the hierarchy and associated with a stronger authentication technique than the first security level.

17. The computer-implemented method of claim 16 wherein the first security level and the second security level are assigned to the first and second applications, respectively, based on at least one of:
  ascertaining that an indication of the first security level or the second security level is programmed into the first or second application;
  receiving user input that indicates the first security level or the second security level is to be assigned to the first or second application;
  assessing types of personally identifiable information exposed by the first and second applications; and
  determining permissions requested by the first and second applications from the particular computing device.

* * * * *